US006960717B2

(12) United States Patent
Stuart et al.

(10) Patent No.: US 6,960,717 B2
(45) Date of Patent: Nov. 1, 2005

(54) ADJUSTABLE SOLAR PANEL

(75) Inventors: Donald J. Stuart, Cumming, GA (US); Patrick H. Ryan, Jr., Atlanta, GA (US)

(73) Assignee: American Signal Company, Atlanta, GA (US)

( * ) Notice: Subject to any disclaimer, the term of this patent is extended or adjusted under 35 U.S.C. 154(b) by 214 days.

(21) Appl. No.: 10/188,563

(22) Filed: Jul. 2, 2002

(65) Prior Publication Data

US 2003/0070708 A1 Apr. 17, 2003

Related U.S. Application Data

(63) Continuation-in-part of application No. 09/981,139, filed on Oct. 16, 2001, now Pat. No. 6,552,257.

(51) Int. Cl.[7] .......................................... H01L 31/042
(52) U.S. Cl. .................. 136/246; 136/291; 136/259; 250/203.4; 126/600; 126/608; 257/431; 160/10; 160/351
(58) Field of Search ................. 136/246, 291, 136/259; 250/203.4; 126/600, 608; 257/431; 160/10, 351

(56) References Cited

U.S. PATENT DOCUMENTS

| | | | |
|---|---|---|---|
| 1,366,917 A * | 2/1921 | Latham ...................... 244/233 |
| 1,704,034 A * | 3/1929 | Chauviere ................. 244/17.21 |
| 2,172,668 A * | 9/1939 | Sandberg .................... 296/96.2 |
| 3,089,540 A * | 5/1963 | Schwartz ..................... 160/98 |
| 3,419,434 A | 12/1968 | Colehower |
| 4,063,543 A * | 12/1977 | Hedger ....................... 126/579 |
| 4,077,144 A | 3/1978 | Smits |
| 4,091,799 A | 5/1978 | Steiner |
| 4,129,360 A | 12/1978 | Deflandre et al. |
| 4,172,739 A * | 10/1979 | Tassen ........................ 136/246 |
| 4,175,391 A | 11/1979 | Baer et al. |
| 4,281,369 A | 7/1981 | Batte |
| 4,316,448 A | 2/1982 | Dodge |
| 4,328,789 A * | 5/1982 | Nelson ....................... 126/579 |
| 4,421,943 A | 12/1983 | Withjack |
| 4,481,562 A | 11/1984 | Hickson |
| 4,486,820 A | 12/1984 | Baba et al. |
| 4,771,764 A | 9/1988 | Cluff |
| 4,933,020 A | 6/1990 | Wenzel |

(Continued)

FOREIGN PATENT DOCUMENTS

JP 3-161658 A * 7/1991

(Continued)

OTHER PUBLICATIONS

ADDCO, Inc. website pages for S.T.A.R. system, copyright—2000

Primary Examiner—Alan Diamond
(74) Attorney, Agent, or Firm—Jason A. Bernstein; Powell Goldstein LLP

(57) ABSTRACT

A nonrotating adjustable solar panel for optimizing cell charging of a portable message sign, comprising a movable frame, a message sign, a solar panel, a support post attached to the underside of the solar panel by a universal joint, and a mechanism for adjusting the angle and position of the solar panel comprising a pair of outwardly extending arms, a pair of threaded support rods, each rod extending through an aperture in the arm, and a handle for turning the rod. Each rod is coupled to the underside of the solar panel by a ball or universal joint. As each rod is turned, it raises or lowers a portion of the solar panel, providing tilting and pivoting, but not rotating motion for adjustment of the solar panel angle.

24 Claims, 4 Drawing Sheets

U.S. PATENT DOCUMENTS

| | | |
|---|---|---|
| 4,968,355 A | 11/1990 | Johnson |
| 4,977,488 A | 12/1990 | Spotts et al. |
| 4,999,059 A | 3/1991 | Bagno |
| 5,022,929 A | 6/1991 | Gallois-Montbrun |
| 5,169,456 A | 12/1992 | Johnson |
| 5,217,296 A | 6/1993 | Tanner et al. |
| 5,228,924 A | 7/1993 | Barker et al. |
| 5,317,145 A * | 5/1994 | Corio ........................ 250/203.4 |
| 5,379,753 A | 1/1995 | Noennich |
| 5,542,203 A | 8/1996 | Luoma et al. |
| 5,600,124 A * | 2/1997 | Berger ........................ 250/203.4 |
| 5,630,660 A | 5/1997 | Chen |
| 5,632,823 A | 5/1997 | Sharan |
| 5,660,644 A | 8/1997 | Clemens |
| 5,730,117 A | 3/1998 | Berger |
| 5,850,579 A | 12/1998 | Melby et al. |
| 5,890,794 A | 4/1999 | Abtahi et al. |
| 5,980,052 A * | 11/1999 | Thor et al. ................... 359/877 |
| 6,058,930 A * | 5/2000 | Shingleton ................... 126/600 |
| 6,239,353 B1 | 5/2001 | Hall et al. |
| 6,284,968 B1 | 9/2001 | Niesyn |
| 6,552,257 B1 * | 4/2003 | Hart et al. ................... 136/246 |
| 2004/0004844 A1 * | 1/2004 | Ryan, Jr. .................... 362/545 |

FOREIGN PATENT DOCUMENTS

| | | | |
|---|---|---|---|
| JP | 2001-7374 A | * | 1/2001 |
| JP | 0200100737 A | | 1/2001 |

* cited by examiner

ADJUSTABLE SOLAR PANEL

CROSS-REFERENCE TO RELATED APPLICATION

This application is a continuation-in-part of application Ser. No. 9/981,139, filed Oct. 16, 2001, now U.S. Pat. No. 6,552,257 entitled NONROTATING SOLAR PANEL, and commonly assigned to the assignee of the present application, the disclosure of which is incorporated by reference in its entirety herein.

FIELD OF THE INVENTION

The present invention relates generally to solar panels with adjustable supports, and more particularly, to solar panels for electrically powered devices such as portable signage and which incorporate adjustable mounting supports for optimally orienting the solar panel relative to the sun.

BACKGROUND OF THE INVENTION

Portable signs are used in a variety of applications such as roadside traffic control and message signs and commercial advertising. Such roadside traffic signs are commonly used to identify and designate vehicle lanes and entry and exit ramps, to provide other traffic control information, and to alert drivers of traffic conditions, construction sites, and other important road conditions.

Roadside signs are commonly mounted on a trailer frame that allows the sign to be towed by a vehicle to different locations. To provide sufficient sign illumination at night and during low sunlight daytime periods, portable roadside signs commonly have a portable rechargeable battery and a generator or a solar panel for recharging the battery during daylight. The solar panels typically comprise an array of operatively connected photovoltaic cells that produce a voltage and transmit an electrical current to the battery and/or sign for operation thereof.

In order for the solar panel to receive as much solar energy as possible for conversion into electricity, it is desirable to mount the solar panel on an adjustable support apparatus that allows for variably orienting the solar panel relative to the general position of the sun. For example, when a portable sign is moved to a new location in the Northern hemisphere, the solar panel should be adjusted to face a Southerly direction while allowing the sign to face the desired target audience.

It is often necessary or desirable to relocate such signs after some time; therefore, portability is an important feature of any sign designed for roadway use. Additionally, it is often necessary or desirable to operate such signs at night and during low sunlight daytime periods, therefore, illumination and a portable power supply are also important features of any roadside sign.

Many existing devices generally provide for tilting and rotation of the panel. Tilting of the panel is generally provided by a pivotal connection at the bottom of the panel and a drive mechanism of some sort, with the panel bottom either directly hinged to a base of some sort or hingedly connected to a rigid non-extendable linkage. Several of these devices also provide for rotation of the panel, however, such rotation is independently provided by separately rotating the support apparatus (such as a pole or plate) for the entire panel, thereby requiring an additional drive mechanism to accomplish rotation in addition to tilting.

It would be desirable to have a tilting nonrotating adjustable solar panel which can be used for electrically powering devices such as portable signage, and that has adjustable mounting supports for optimally orienting the solar panel at any angle relative to the sun by simple, reliable, cost-effective means.

SUMMARY OF THE INVENTION

The present invention provides a solar panel and an apparatus for tilting nonrotational movement of the panel to permit positioning to optimize absorption of solar energy and charging of the batteries. In a first embodiment, the present invention provides a tiltable nonrotating panel assembly comprising a panel; a support mast associated with the panel and the base, the support mast having an upper end terminating in a coupling, the coupling being mounted to the panel; and, a pivoting assembly for pivoting the panel with respect to the support mast. The pivoting assembly comprises at least two arms extending radially outward from the support mast and at an angle with respect to each other, each arm having an aperture defined at one end distal to the support mast, each arm having a rod having an upper end and a lower end and extending through the aperture and having a means associated with the rod for axially turning the rod. The present invention can also be part of a conventional portable message display apparatus which additionally comprises a base and a message sign. As each rod is turned, it raises or lowers a portion of the solar panel, providing tilting and pivoting, but not rotating motion for adjustment of the solar panel angle.

A second embodiment of the present invention provides a tiltable nonrotatable panel apparatus having a central post and at least two side posts. This embodiment comprises a panel; a base; a height adjustable first post having an upper first end, a lower second end, and means for adjusting the height of the first post. The first post first end is movably associated with the panel and the first post second end is movably associated with the base. This embodiment also comprises a height adjustable second post having an upper first end, a lower second end, and means for adjusting the height of the second post, the second post first end being movably associated with the panel and the second post second end being movably associated with the base; and, a height adjustable third post having an upper first end, a lower second end, and means for adjusting the height of the third post, the third post first end being movably associated with the panel and the third post second end being fixedly associated with the base.

These and other features and advantages of the present invention are discussed or apparent in the following detailed description of the invention, in conjunction with the accompanying drawings and the appended claims.

BRIEF DESCRIPTION OF THE DRAWINGS

The various features and advantages of the invention will be apparent from the attached drawings, in which like reference characters designate the same or similar parts throughout the figures, and in which.

DETAILED DESCRIPTION OF THE INVENTION

In general the present invention provides an apparatus for raising, lowering, tilting and pivoting an object. The object in a broad aspect can be any object capable of being mounted on a support or rod. Preferably, the object is a conventional solar panel, but, can alternatively be a mirror or other light reflecting surface, artwork, energy transmitter and/or receiver, sound transmission device, light transmission device (e.g., a single or array of lamps or lasers), heat reflector or transmitter, or the like. For the purposes of the present disclosure, a solar panel will be discussed as a preferred, but nonlimiting, example.

Figure 1:
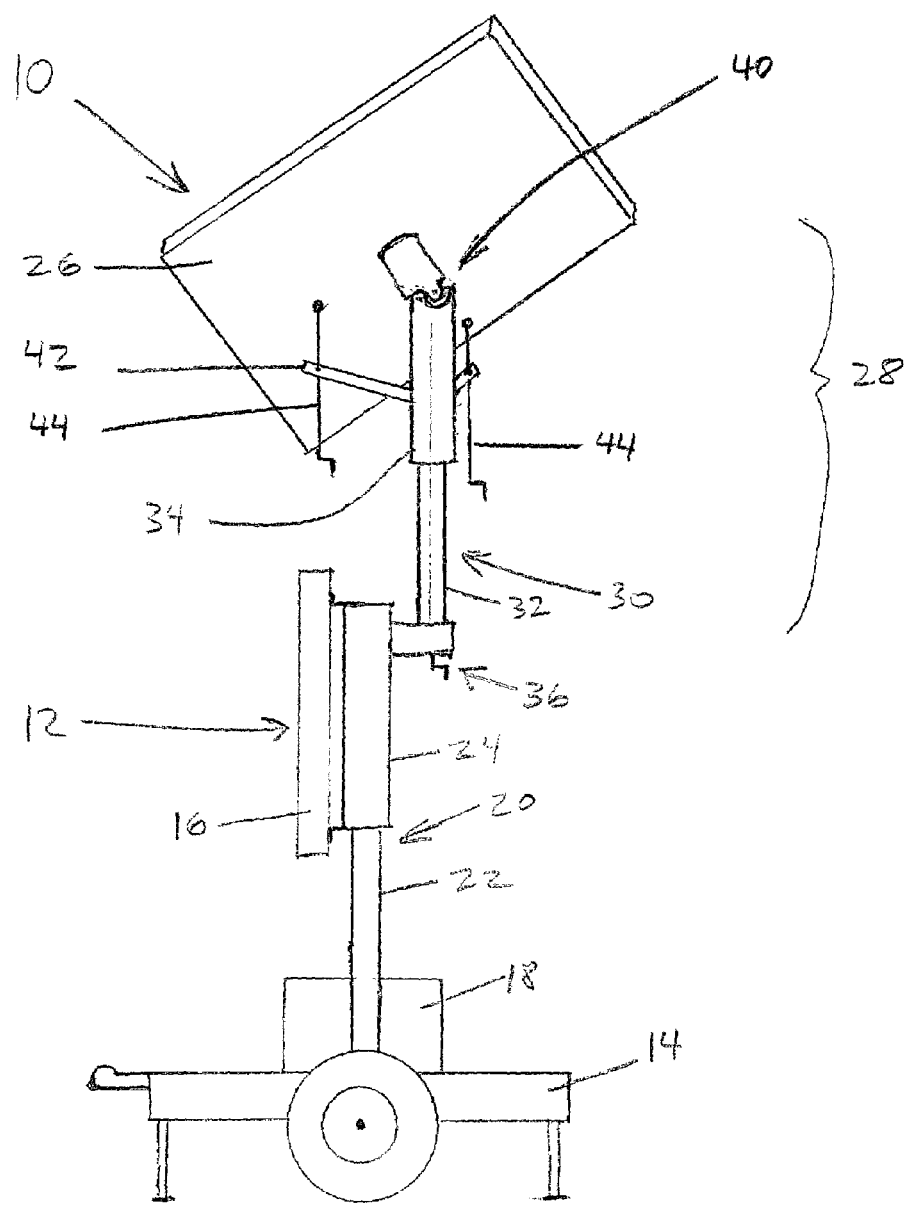
FIG. 1 is a side elevation view of a first embodiment of the present invention.

FIG. 1 shows a first embodiment of an apparatus of the present invention. For illustration purposes only, an adjustable solar panel assembly 10 is described herein in conjunction with a conventional mobile message display sign 12. An example of such a unit is model number CMS-T321, available from American Signal Company, Atlanta, GA. (www.amsig.com). It will be understood by those skilled in the art, however, that the apparatus 10 can be mounted to and used to provide power to any appropriate electrically powered device, mobile or fixed, as may be desired in a given application.

The sign 12 may comprise a wheeled transport frame 14, a sign panel 16 mounted to the wheeled frame 14, and a chargeable battery 18 mounted to the frame 14 or the sign panel 16 and electrically connected to the sign panel 16. The sign panel 16 may have electrically powered features such as illumination, movement, power management controls, adjustable supports for a solar panel, and the like. Also, the sign 12 may be mounted to the frame 14 by a sign mast 20 having first 22 and second 24 telescopic sign mast members for raising and lowering the sign panel 16.

The adjustable solar panel assembly 10 comprises a solar panel 26 and an angularly adjustable support assembly 28. The solar panel 26 can be of a conventional type known by those skilled in the art. The solar panel 26 is electrically connected to the battery and/or to the sign panel 16 to permit converting solar energy into electricity for charging the battery and powering the sign panel 16. It will be understood by those skilled in the art that mirrors, lenses, sun shades, and other structures may be advantageously utilized in conjunction with the support apparatus 28.

The adjustable support apparatus 28 generally provides three points defining a plane (i.e., the solar panel 26), with the three points being pivotable to allow for adjusting the plane at any of a number of angles or positions relative to the sun without the need for rotating the plane. The adjustable support apparatus 28 comprises a main mast 30 mounted to the sign panel 16 or to the frame 14 by one or more brackets, by welding, or by other mechanical connections known in the art for preventing rotation of the main mast 30 relative to the sign panel 16 and frame 14. The main mast 30 can have a circular, rectangular, or other regular or irregular cross-sectional shape.

The main mast 30 preferably has first 32 main mast member and a second 34 main mast member for raising and lowering the solar panel 26 sufficiently so that the solar panel 10 can be angled without being contacted and prevented from moving by the sign panel 16, and lowered sufficiently so that the trailer frame 14 is stable when in transport and the solar panel 26 does not hit bridges, trees, and other potential obstructions.

The first 32 and second 34 main mast members can be arranged telescopically or in another configuration known in the art for permitting raising and lowering of the solar panel 26. The main mast 30 may be provided with a conventional crank assembly 36 such as jackscrew or the like for manually cranking the solar panel 26 up and down. Alternatively, the main mast 30 may be provided by a hydraulic, pneumatic, or electric cylinder, or another mechanism known to those skilled in the art, with conventional controls for vertically adjusting the height of the solar panel 26.

Figure 2:
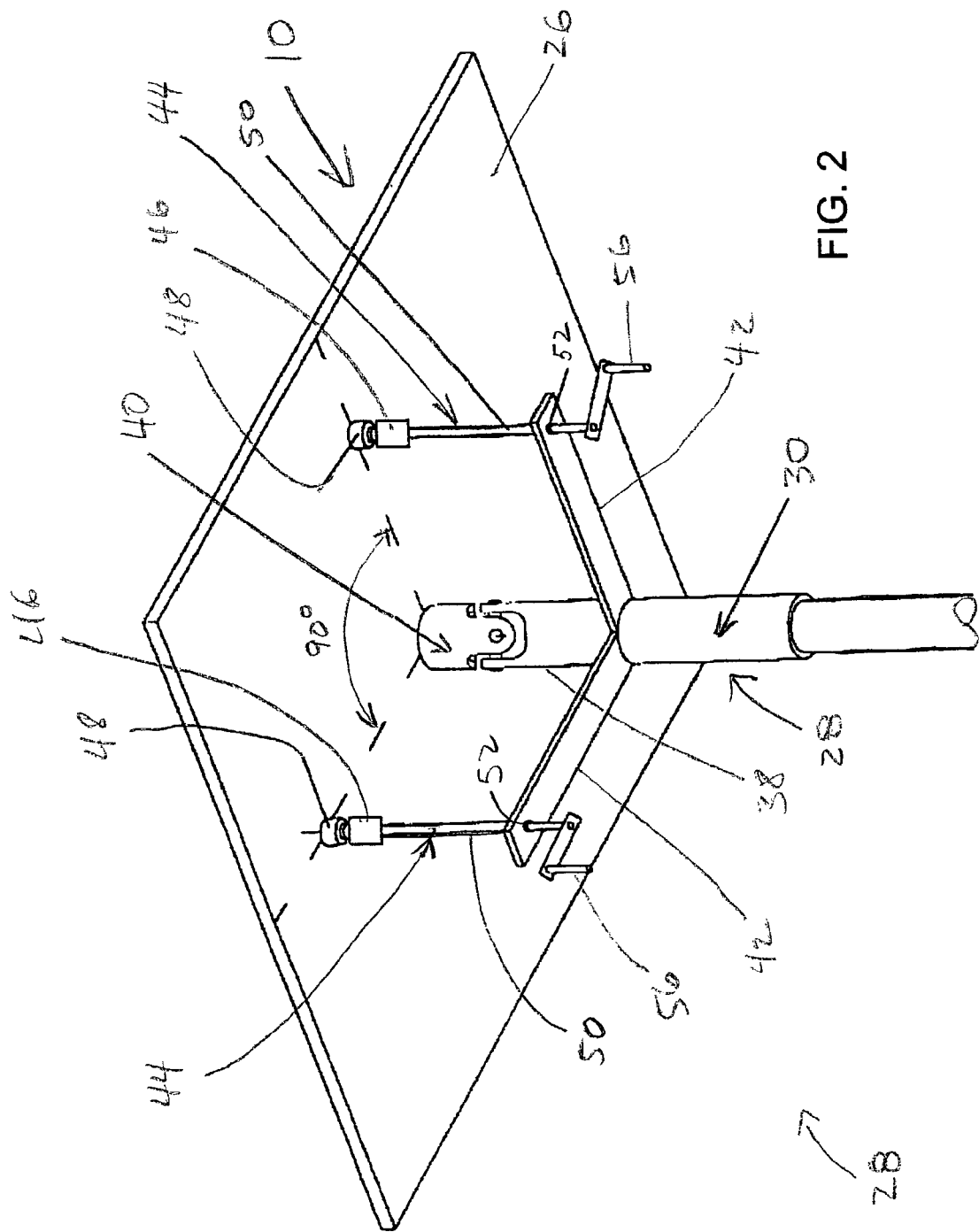
FIG. 2 is a perspective view of the solar panel and adjustable support apparatus of FIG. 1.

Referring now to FIG. 2, the main mast 30 has an upper portion 38 that is attached to the solar panel 26 by a coupling 40. The coupling 40 is preferably attached to the solar panel 26 at about the center of gravity of the solar panel 26 providing balance and stability. The coupling 40 comprises a universal joint, a gimbaled mechanism, or other coupling mechanism known to those skilled in the art for permitting movement about two axes but not permitting rotation or translation.

The adjustable support apparatus 28 further comprises at least two arms 42 and at least two adjusting masts 44. In one embodiment two arms 42 and two adjusting masts 44 are used. The arms 42 and adjusting masts 44 cooperate to permit vertically adjusting the solar panel 26 at two points. Each arm 42 extends from the main mast 30 at a position below the upper end 38 thereof. Each arm 42 can be provided by a plate, a channel member, a bar, a rod, or another structure known in the art. The arms 42, adjusting masts 44, and main mast 30 can be made of a metal, plastic, composite, or other generally rigid durable material known in the art.

Each adjusting mast 44 has an upper end 46 attached to the solar panel 26 by an upper coupling 48 such as a ball joint or another coupling permitting free swivel and free rotary motion of the adjusting mast 44. Preferably, the adjusting masts 44 and main mast 30 are attached to the solar panel 26 in a 90 degree configuration, and the arms 42 are attached to the main mast 30 in a 90 degree configuration, with the each adjusting mast 44 aligned with and intersecting one of the arms 42. Alternatively, the mast 44 can be associated directly with the solar panel 26. The mast 44 is preferably, though not mandatorily, able to undergo at least some degree of flexion.

Figure 3A:
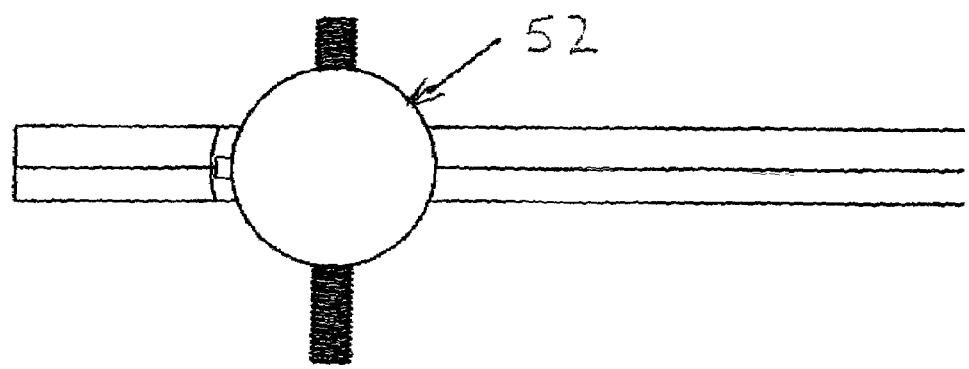
FIGS. 3A and 3B are detail views of the adjustable mast lower coupling of FIG. 2; and, FIG. 4 is a perspective view of a second embodiment of the present invention.
Figure 3B:
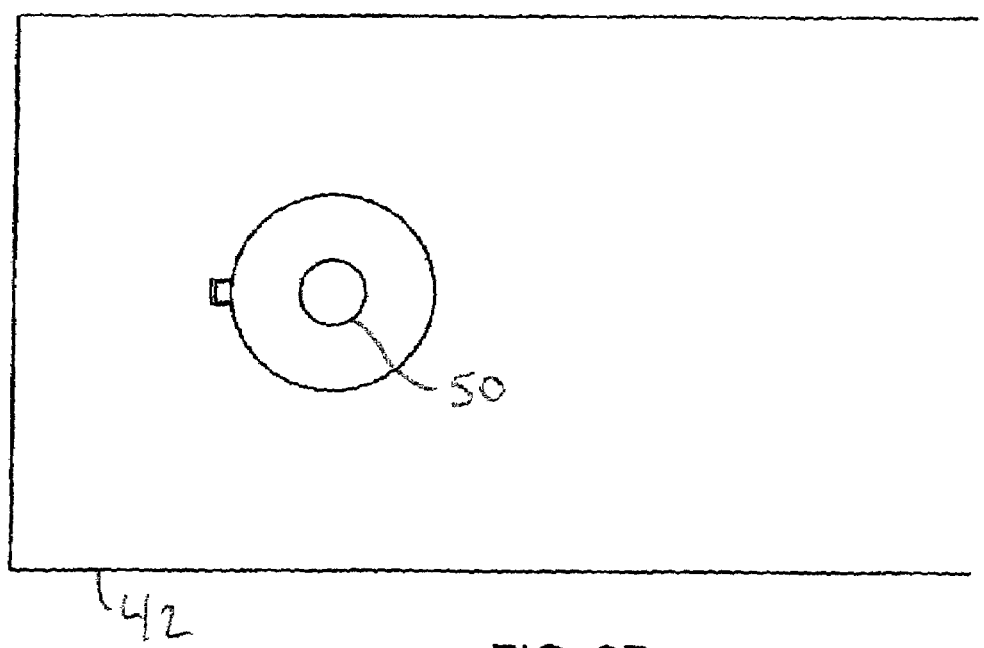

Each adjusting mast 44 may be provided by a threaded rod 50 extending through a threaded aperture 52 in each arm 42 for permitting vertical adjustment of each adjustable mast 44, A lower coupling (not shown), such as, but not limited to, a nut mounted in a gimbaled mechanism, is provided for connecting the rod 50 to the arm 42. The lower coupling permits a swivel movement of the rod 50 relative to the arm 42, and allows tuning of the rod 50 to enable the mated threads to permit the rod 50 to be raised or lowered (see FIGS. 3A and 3B). A spherical shaped nut in a mating socket with an anti-rotation pin will allow pivoting in any direction without rotation. Also, each rod 50 can be provided with a handle 56 attached thereto for manually cranking each rod 50 up and down through the aperture 52. Alternatively, other configurations or mechanisms for turning the rod 50 can be used, such as, but not limited to, a wingnut, thumbscrew, gear and crank mechanism, nut, combinations of the foregoing, or the like.

Alternatively, the adjustable masts 44 may be provided by a hydraulic, pneumatic, or electric cylinder, or another mechanism known in the art, with conventional controls for adjusting the height of to solar panel 26. In this case, the lower couplings can be provided by ball nuts or other couplings permitting free swivel and rotary movement. There may also be provided conventional light sensors (not shown) such as photoelectric cells and conventional controls (not shown) for operating the cylinders to cause the solar panel 26 to track the sun as it moves across the sky.

When the support apparatus 28 is vertically adjusted, the main mast 30 might be urged to rotate and/or translate. Because the main mast 30 is attached to the sign panel 16 or the frame 14 by a non-rotary connection and attached to the solar panel 26 by coupling 40 that permits movement about two axes but not rotation or translation, and, because the adjusting mast upper couplings 48 permit free swivel and free rotary movement, the solar panel is secured from rotating or translating relative to the sign panel 16 and the frame 14. Thus, the adjusting masts 44 can be vertically extended or retracted to adjust the solar panel 26 to any angle without rotating the main mast 30. It will be understood that for applications where all that is desired is tilting the solar panel 26 about one axis, a single arm 42 and adjusting mast 44 can be used. By judiciously locating the arm, the solar panel can be tilted in any direction.

In operation, the mobile sign 12 is transported to a desired location and the sign mast 20 is adjusted to position the sign panel 16 at the desired height and facing the desired direction The main mast 30 is ten adjusted to raise the solar panel 26 to the desired height. The adjusting masts 44 can be quickly and easily operated to orient the solar panel 26 in a direction selected for maximum solar exposure throughout the day. At such time as it is desired to relocate the mobile sign 12, to sign mast 20 is adjusted to lower to sign panel 16 and the main mast 30 is adjusted to lower the solar panel 26 for transport of the mobile sign to another location.

Figure 4:
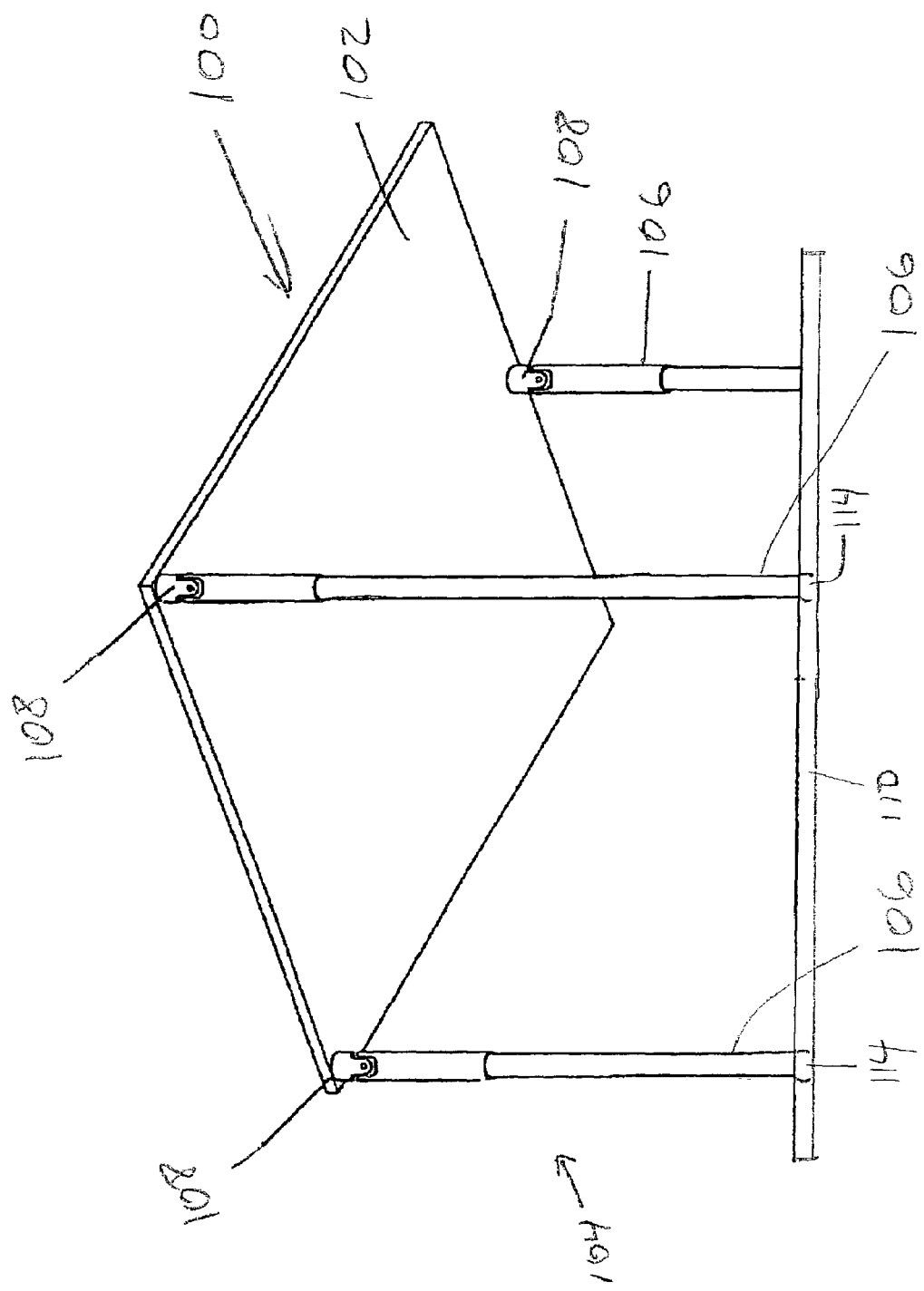

Referring now to FIG. 4, there is illustrated a second embodiment of the solar panel assembly of the present invention, generally referred to as 100. The second embodiment includes comprises a solar panel 102 with an adjustable support apparatus 104.

The support apparatus 104 comprises at least three adjusting masts 106 each attached to the solar panel 102. The adjusting masts 106 can be telescopic, nut and threaded rod, rack and pinion or have another configuration known to those skilled in the art for permitting raising and lowering of the, solar panel 102. Thus, the adjusting masts 106 can be provided by a conventional crank assembly such as jackscrew or the like for manually cranking the solar panel 26 up and down. Alternatively, the adjusting masts 106 can be provided by hydraulic, pneumatic, electric or other powered cylinders with conventional controls for vertically adjusting the height of the solar panel 26.

Each adjustable mast 106 is attached to the solar panel 102 by a coupling 108. Each coupling 108 can be a universal joint, a gimbaled mechanism, a ball joint, or other coupling mechanism known to those skilled in the art for permitting movement about two axes, but not permitting rotation or translation. Preferably, two of the adjusting masts 106 are attached to the solar panel at adjacent corners of the solar panel 102 and the third adjusting mast 106 at about the midpoint along the opposing side of the solar panel 102, thereby forming the points of an isosceles or other shaped triangle.

The adjusting masts 106 are attached to a plate 110. Two of the adjusting masts 106 are attached to the plate 110 by a lower coupling 114 such as a ball joint or another coupling permitting a free swiveling movement. The third adjusting mast 106 is fixedly attached to the plate 110 for permitting no movement.

The plate 110 may be defined by the top and/or sides of a sign panel 16 similar to that provided by the first embodiment, or the plate 110 may be a separate structure attached to the top and/or sides of such a sign panel. Alternatively, the plate 110 can be attached to a main mast or attached to a trailer frame 14.

Accordingly, there are a number of advantages provided by the present invention. The invention generally provides three pivot points defining a plane on the surface of a solar panel or the like, thus providing the capability for adjusting the plane at any angle relative to the sun without the need for rotating the plane.

Additionally, the invention provides a support apparatus having a main mast 30 attached to the solar panel 26 so as to be restricted from rotation or translation and at least two vertically adjustable masts 44 attached to the solar panel 26 so as to be that permit free swivel and rotation, thus providing the capability of vertically extending or retracting the adjusting masts 44 to adjust the solar panel 26 to any angle without rotating the main mast 30.

Furthermore, there is provided a support apparatus having three vertically adjustable masts 106 pivotally connected to the solar panel 102 so as to prevent rotation or translation of the solar panel 102, thus providing the capability of vertically extending or retracting the adjusting masts 106 to adjust the solar panel 102 to any angle without rotating the solar panel 102.

It will be understood that the terms "a" and "an" as used herein are not intended to mean only "one," but may also mean a number greater than "one." All patents, applications and publications referred to herein are hereby incorporated by reference in their entirety. While the invention has been described in connection with certain preferred embodiments, it is not intended to limit the scope of the invention to the particular forms set forth, but, on the contrary, it is intended to cover such alternatives, modifications, and equivalents as may be included within the true spirit and scope of the invention as defined by the appended claims.

What is claimed is:

1. A tiltable nonrotating panel assembly, comprising:
    a) a panel;
    b) a base;
    c) a support mast associated with said panel and said base, said support mast having an upper end terminating in a coupling, said coupling being mounted to said panel; and,
    d) a pivoting assembly for pivoting said panel with respect to said support mast, said pivoting assembly comprising,
        i) at least two arms extending radially outward from said support mast and at an angle with respect to each other,
        ii) each arm having an aperture defined at one end distal to said support mast,
        iii) each arm having a rod having an upper end and a lower end and extending through said aperture and having a means associated with said rod for axially turning said rod.

2. The apparatus of claim 1, wherein each said rod is at least partially threaded.

3. The apparatus of claim 1, wherein each said rod further comprises a coupling associated with its respective upper end, said coupling contacting said panel.

4. The apparatus of claim 3, wherein a said coupling comprises a ball joint.

5. The apparatus of claim 1, wherein said means for axially turning said rod is a handle.

6. The apparatus of claim 5, wherein said handle is associated with said lower end of said rod.

7. The apparatus of claim 1, wherein said coupling associated with said upper end of said support mast is a universal joint.

8. The apparatus of claim 1, wherein said support mast comprises at least two telescoping sections.

9. The apparatus of claim 8, further comprising a support mast adjustment rod at least partially threaded and disposed coaxial with said support mast, said support mast adjustment rod having a handle associated therewith for turning said support mast adjustment rod and causing at least one section of said support mast to raise or lower.

10. The apparatus of claim 1, wherein said support mast further comprises a means for raising and lowering a portion of said support mast.

11. A portable message display apparatus, comprising:
a) a base;
b) a message sign associated with said base;
c) a solar panel;
d) a support mast associated with said solar panel and said base, said support mast having an upper end terminating in a coupling, said coupling being mounted to said solar panel; and,
e) a pivoting assembly for pivoting said solar panel with respect to said support mast, said pivoting assembly comprising,
   i) at least two arms extending radially outward from said support mast and at an angle with respect to each other,
   ii) each arm having an aperture defined at one end distal to said support mast,
   iii) each arm having a rod having an upper end and a lower end and extending through said aperture and having a means associated with said rod for raising and lowering said rod.

12. The apparatus of claim 11, wherein each said rod is at least partially threaded.

13. The apparatus of claim 11, wherein each said rod farther comprises a coupling associated with respective upper end, said coupling contacting said solar panel.

14. The apparatus of claim 13, wherein a said coupling comprises a ball joint.

15. The apparatus of claim 11, wherein said means for raising and lowering said rod is a handle.

16. The apparatus of claim 15, wherein said handle is associated with said lower end of said rod.

17. The apparatus of claim 11, wherein said coupling associated with said upper end of said support mast is a universal joint.

18. The apparatus of claim 11, wherein said support mast comprises at least two telescoping sections.

19. The apparatus of claim 1, further comprising a support mast adjustment rod at least partially threaded and disposed coaxial with said support mast, said support mast adjustment rod having a handle associated therewith for turning said support mast adjustment rod and causing at least one section of said support mast to raise or lower.

20. The apparatus of claim 11, wherein said support mast further comprises a means for raising and lowering a portion of said support mast.

21. A tiltable nonrotatable panel apparatus, comprising:
a) a panel;
b) a base;
c) a height adjustable first post having
   i) an upper first end,
   ii) a lower second end, and
   iii) means for adjusting the height of said first post said first post first end being movably associated with said panel and said first post second end being movably associated with said base,
d) a height adjustable second post having
   i) an upper first end,
   ii) a lower second end, and
   iii) means for adjusting the height of said second post first end being movably associated with said panel and said second post second end being movably associated with said base; and,
e) a height adjustable third post having
   i) an upper first end,
   ii) a lower second end, and
   iii) means for adjusting the height of said third post, said third post first end being movably associated with said panel and said third past second end being fixedly associated with said base;
f) wherein said first end of each of said first, second and third posts is coupled to said panel by a universal joint.

22. The apparatus of claim 21, wherein each said first, second and third posts comprise at least two telescoping sections.

23. The apparatus of claim 21, wherein said lower end of said post is associated with said base by a coupling and wherein said lower end of said second post is associated with said base by a coupling.

24. The apparatus of claim 21, wherein said panel is generally square or rectangular shaped and said first post upper first end is located in a first corner of said panel, said second post upper first end is located in a second corner of said panel, said second corner being generally on the same side as said first corner, and said third post upper first end is located generally midways between the sides of said panel opposing said first and second corners.

* * * * *